United States Patent [19]

Casey et al.

[11] Patent Number: 5,034,426
[45] Date of Patent: * Jul. 23, 1991

[54] AROMATIC DIAMINE CATALYTIC CHAIN EXTENDERS

[75] Inventors: Jeremiah P. Casey, Emmaus; Susan M. Clift, North Wales; Kenneth M. Kem, Old Zionsville, all of Pa.

[73] Assignee: Air Products and Chemicals, Inc., Allentown, Pa.

[ * ] Notice: The portion of the term of this patent subsequent to Mar. 13, 2007 has been disclaimed.

[21] Appl. No.: 468,410

[22] Filed: Jan. 22, 1990

Related U.S. Application Data

[63] Continuation-in-part of Ser. No. 266,463, Nov. 2, 1988, Pat. No. 4,937,306, which is a continuation-in-part of Ser. No. 75,363, Jul. 20, 1987, abandoned.

[51] Int. Cl.$^5$ .................... C08G 18/18; C08G 18/32
[52] U.S. Cl. ...................... 521/163; 528/73; 528/85
[58] Field of Search ............. 521/163; 528/73, 85

[56] References Cited

U.S. PATENT DOCUMENTS

| | | | |
|---|---|---|---|
| 3,248,369 | 4/1966 | Weidman et al. | 260/75 |
| 3,630,987 | 12/1971 | Thoma et al. | 260/32.6 |
| 3,794,621 | 2/1974 | Meckel et al. | 260/75 |
| 3,839,292 | 10/1974 | Ermidis | 260/75 |
| 4,016,143 | 4/1977 | Blahak et al. | 521/163 |
| 4,026,840 | 5/1977 | Bechara et al. | 260/2.5 |
| 4,039,514 | 8/1977 | van Gulick | 260/75 |
| 4,101,470 | 7/1978 | McEntire | 521/118 |
| 4,133,943 | 1/1979 | Blahak et al. | 521/163 |
| 4,222,955 | 9/1980 | Chung et al. | 260/465 |
| 4,326,042 | 4/1982 | Zimmerman | 521/115 |
| 4,350,778 | 9/1982 | Dominguez et al. | 521/118 |
| 4,482,690 | 11/1984 | Orphanides | 528/64 |
| 4,500,654 | 2/1985 | Carlsen et al. | 521/129 |
| 4,519,432 | 5/1985 | Schmidt et al. | 152/357 |
| 4,587,275 | 5/1986 | Kopp et al. | 521/163 |
| 4,908,394 | 3/1990 | Casey et al. | 521/163 |
| 4,937,306 | 6/1990 | Casey et al. | 528/73 |

Primary Examiner—John Kight, III
Assistant Examiner—Dennis R. Daley
Attorney, Agent, or Firm—Keith D. Gourley; James C. Simmons; William F. Marsh

[57] ABSTRACT

The present invention relates to a process for the production of polyurethanes wherein a tertiary amine functionality is incorporated into the side chain of an aromatic diamine, preferably a diaminobenzamide, to form a catalytic polyurethane chain extender. These chain extenders are polyurethane catalysts that provide adequate cure without residual odor and safety hazards associated with the more traditional tertiary amine catalysts. When reacted with the isocyanate reactive group the non-tertiary amine portion of the chain extender is bound to the polymeric network. Diffusion of the catalyst species from the polyurethane has been prevented, thus negating odor and toxicity as problems. These aromatic diamines provide enhanced polyurethane physical properties.

2 Claims, 1 Drawing Sheet

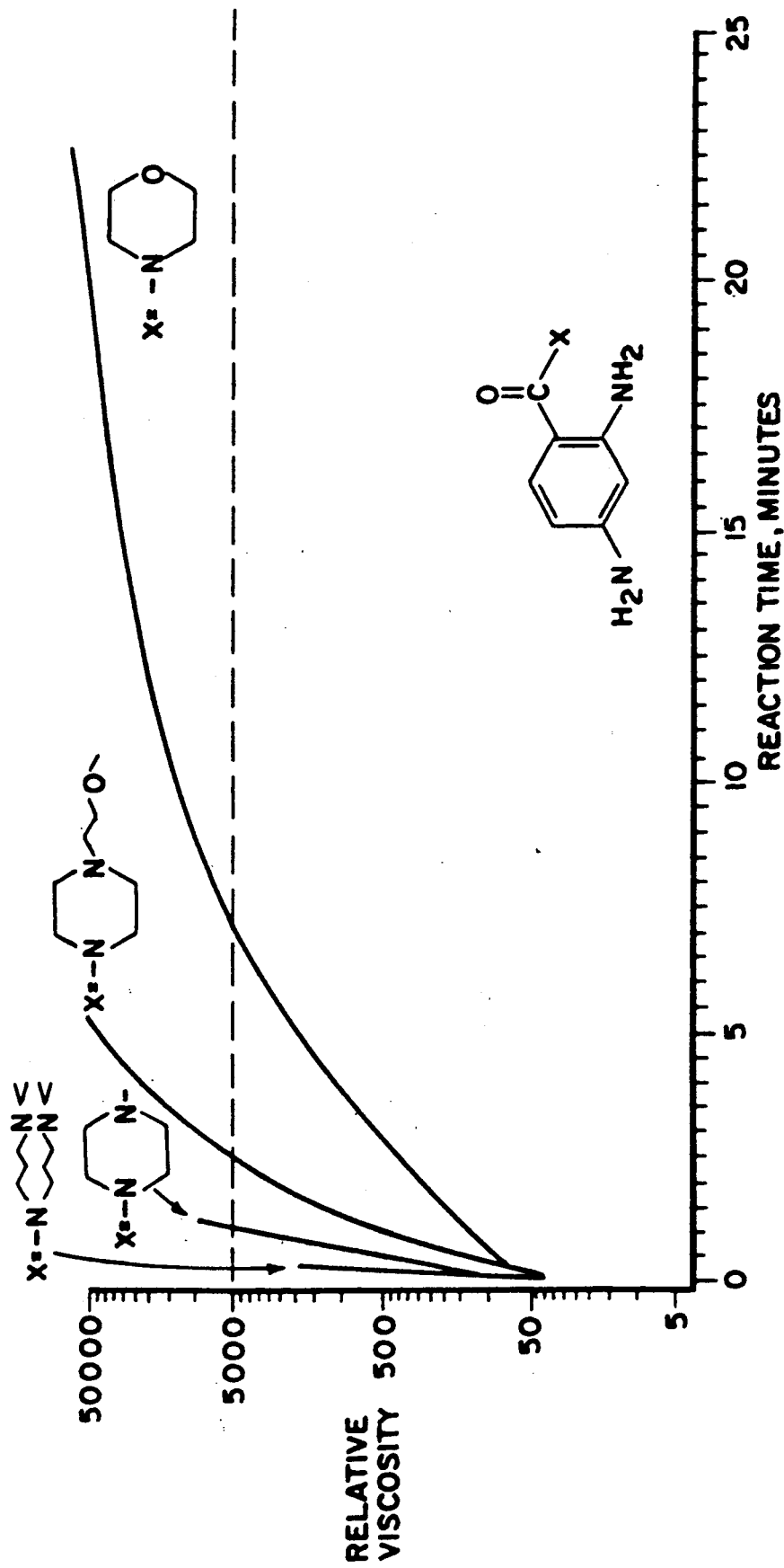

AROMATIC DIAMINE CATALYTIC CHAIN EXTENDERS

This application is a continuation-in-part of application Ser. No. 266,463, filed on Nov. 2, 1988, now U.S. Pat. No. 4,937,306, which is a continuation-in-part of application Ser. No.075,363, filed on July 20, 1987, now abandoned, the subject matter of the above-mentioned applications which is specifically incorporated by reference herein.

FIELD OF THE INVENTION

The present invention relates to a process for the preparation of polyurethane. More specifically, the present invention relates to the use of a tertiary amine derivative of an aromatic diamine as a catalyst in the preparation of polyurethane.

BACKGROUND OF THE INVENTION

Several processes are known in the art using either tertiary amine catalysts or diamine chain extenders. The following are among them.

U.S. Pat. No. 3,248,369 discloses a process for production of crosslinked resinous films utilizing a tertiary amine acrylate catalyst which can be represented by the formula:

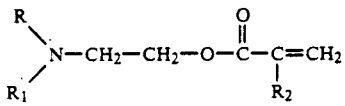

wherein R and $R_1$ are selected from the class consisting of alkyl radicals containing 1 to 4 carbon atoms and $R_2$ is selected from the class consisting of hydrogen and a methyl radical.

U.S. Pat. No. 3,630,987 discloses linear, segmented polyurethane elastomers and filaments therefrom, produced by reaction of NCO prepolymers with equivalent amounts of compounds of the formula:

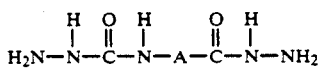

wherein A is m- or p- phenylene or

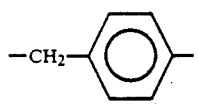

as chain lengthening agents in polar organic solvents.

U.S. Pat. No. 3,794,621 discloses polyurethane elastomers and a method for preparing them wherein the polyurethane elastomers have the structural formulae:

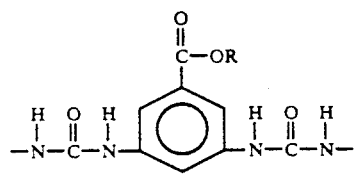

and/or

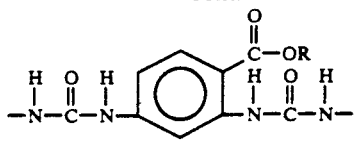

wherein R is an alkyl radical containing from about 1 to 20 carbon atoms which may be branched and which may contain heteroatoms if desired. The polyurethane elastomers disclosed are especially useful in the preparation of moldings which will be subjected to severe mechanical stress such as, for example, rollers.

U.S. Pat. No. 3,839,292 discloses a diamine curative system for polyurethane prepolymers having terminally reactive isocyanate groups comprising 2-cyano-p-phenylene diamine. Such prepolymers are prepared by reacting a polymeric diol with a stoichiometric excess of 2,4-toluene diisocyanate, 2-6-toluene diisocyanate or an isomeric mixture of such containing a major proportion of the 2,4-isomer.

U.S. Pat. No. 4,026,840 discloses isocyanate reactions such as in their condensation with polyols to form polyurethanes and their polymerization to form polyisocyanurates which are promoted by certain hydroxy-alkyl tertiary amine catalysts corresponding to the formula:

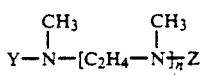

wherein
Y = $CH_3$ or Z
Z = $-CH_2CH_2OH$ and
n = 1 or 2

U.S. Pat. No. 4,039,514 discloses polyurethane/polyurea compositions comprising the reaction product of an organic diisocyanate, a glycol and a derivative of 2,4-diaminobenzoic acid represented by the general formula:

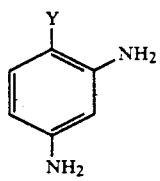

wherein
(a) Y = $CO_2R_1$
or
(b) Y = $CONR_2R_3$
or
(c) Y = $-C\equiv N$ wherein $R_1$ is a $C_1$-8 alkyl which may contain OH or ether groups and $R_2$ and $R_3$, selected from $R_1$, H or aryl ($C_6$-$C_{12}$) or $R_2$ and $R_3$ may be part of a 5 or 6 membered ring which may contain heteroatoms such as O and N. It is apparent from the above-mentioned formula that Y does not contain amine functionality and more particularly tertiary amine functionality.

U.S. Pat. No. 4,101,470 discloses a compound of the formula:

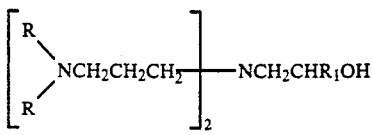

where R is a lower alkyl, $R_1$ is selected from the group consisting of hydrogen, alkyl, aryl, substituted aryl, alkaryl, substituted alkaryl, aralkyl, and substituted aralkyl. Also disclosed is a method of producing a polyurethane by utilizing the above-mentioned compounds as catalysts in the reaction of an organic polyisocyanate with an organic polyester polyol or polyether polyol.

U.S. Pat. No. 4,133,943 discloses an improved process for the production of cellular or non-cellular polyurethane/urea elastomers wherein diamines containing ester groups are used as chain lengthening agents. A characteristic feature of the process is the use of salts of aromatic diaminocarboxylic or sulphonic acids as a portion of the chain lengthening component.

U.S. Pat. No. 4,222,955 discloses a process for curing polyurethanes with substituted aromatic diamines The diamines are individually selected from 3,5-diamino-4-tert-alkylbenzoates, 3,5-diamino-4-tertalkylbenzonitriles and alkylene bis(3-amino-4-tert-alkylbenzoate).

U.S. Pat. No. 4,326,042 discloses the use of N-methoxypropylmorpholine, N-butylmorpholine and N,N'-dimethylpiperazine together as a catalyst system in an activator solution to give finer, more uniform cells to polyester-based polyurethane foams.

U.S. Pat. No. 4,350,778 discloses a method for making reaction injection molded polyurethane having improved paintability properties. The product is formed by reacting a high molecular weight polyhydric polyether, a low molecular weight active hydrogen-containing compound of at least dual functionality, a polyisocyanate and a catalyst combination comprising N-hydroxypropyl-N',N',N'';N'''-tetramethylimino-bispropylamine, dibutyltin dilaurate and an alkylation mercaptide. This catalyst combination results in improved processing, a minimum of product surface defects, excellent green strength and improved paintability using certain paints.

U.S. Pat. No. 4,482,690 discloses a process for the manufacture of polyurethane-urea elastomers formed by reacting a prepolymer of an organic polyisocyanate and a compound having at least two Zerewitenoff active hydrogen atoms with a chain extender comprising t-butylbenzenediamine. The utilization of t-butylbenzenediamine as an aromatic diamine chain extender imparts flexibility to the handling of reactable compositions due to the increase in pot life and imparts excellent tensile modulus to the resulting polymer.

U.S. Pat. No. 4,500,654 discloses a catalyst and process for producing polyurethanes by contacting an organic polyol and an organic isocyanate with a catalyst comprising an N-substituted alkoxyalkylpiperazine and preferably additionally comprising an N-alkoxymorpholine wherein the alkylene moieties of the morpholine and piperazine are independently selected from the group consisting of $C_1$ to about $C_5$ alkylene moieties and wherein the alkoxy moieties are independently selected from the group consisting of $C_1$ to about $C_3$ alkoxy moieties.

U.S. Pat. No. 4,519,432 discloses a polyurethane composition prepared by reacting (1) a prepolymer formed by the reaction of an aromatic polyisocyanate and a polyol with (2) a chain extender mix comprising an aromatic diamine represented by the formula:

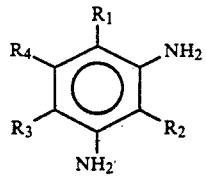

wherein $R_1$, $R_2$, $R_3$ and $R_4$ represent H, alkyl from 1–4 carbon atoms, CN, halogen, $CO_2R_5$, $CONR_6R_7$ represents alkyl of 1–6 carbon atoms and $H_1$ and mixtures thereof. The aromatic diamines do not possess a side chain containing amine functionality and more particularly, do not possess tertiary amine functionality incorporated into a side chain of the aromatic diamine.

SUMMARY OF THE INVENTION

The present invention relates to a catalytic chain extender, the resultant polyurethane formulation utilizing the catalytic chain extender and an improvement to a process for the preparation of a polyurethane wherein the chain extender comprises an aromatic diamine having a tertiary amine functionality incorporated into a side chain of the aromatic diamine. Generally, in a process for the preparation of polyurethane, a polyisocyanate, a polyol, a chain extender and a catalyst are reacted together, either by a one-shot method or by the preparation and subsequent curing of a prepolymer. The catalytic chain extenders utilized in the present invention are represented by the general formulae:

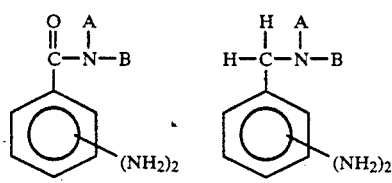

and

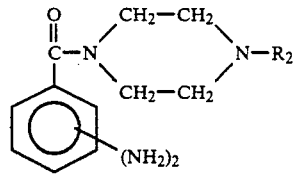

wherein:

A = H, $C_{1-4}$ alkyl, $C_{2-6}$ alkoxyalkyl or B; and

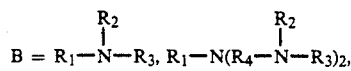

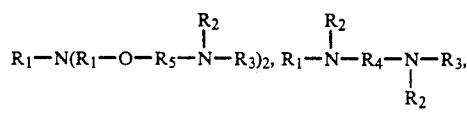

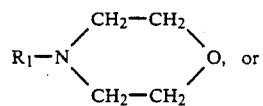

-continued

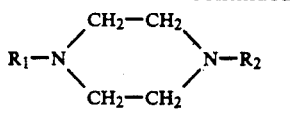

and
$R_1 = (CH_2)_n$ n= 2-5
$R_2, R_3 = C_{1-4}$ alkyl or $C_{2-6}$ alkoxyalkyl,
$R_4 = C_{2-9}$ alkyl and
$R_5 = C_{1-4}$ alkyl.

BRIEF DESCRIPTION OF THE DRAWING

The single FIGURE of the drawing is a plot of rheological data for four polyurethanes prepared using selected aromatic diamine catalysts.

DETAILED DESCRIPTION OF THE INVENTION

The present invention pertains to a polyurethane composition and a process for preparing the same wherein a tertiary amine functionality is incorporated into the sidechain of an aromatic diamine to form a catalytic chain extender.

In contrast to prior art aromatic diamine chain extenders which possess an amide side chain, the chain extenders of the present invention possess an amide side chain which is further provided with tertiary amine functionality. As will be demonstrated herein, the incorporation or tertiary amine functionality into a side chain of an aromatic diamine provides novel chain extenders which provide numerous advantages over conventional aromatic diamine chain extenders which do not incorporate tertiary amine functionality into a side chain.

The use of catalysts in preparing polyurethane by reacting a polyisocyanate, a polyol, and perhaps other ingredients is known in the art. In order to provide polyurethanes with the desired physical properties, the catalyst employed must promote the many reactions which proceed simultaneously and competitively at balanced rates during the polymerization process. One such reaction is between a hydroxyl-containing molecule and an isocyanate to form a urethane. A second reaction is an isocyanate-water reaction by which an isocyanate-terminated molecule is hydrolyzed and $CO_2$ is generated to blow or assist in the blowing of foam, e.g., in the preparation of one-shot flexible foams.

Tertiary amines have become well-established as catalysts for the production of polyurethane foams. They accelerate both urethane-forming and blowing reactions. Many amines of this class, however, have a strong odor which is carried over to the polyurethane foam. Final product odor may be reduced by using volatile catalysts such as N-methylmorpholine, but poor cure often results from too rapid a loss of catalyst in the foaming process. Moreover, high volatility usually means low flash-point, high vapor concentration and handling problems. Toxicity of some tertiary amines can also be a problem. Tetramethylbutanediamine, for example, is no longer used in large scale because of its physiological effects, and diethylaminopropionitrile was withdrawn from use in 1978 when it was found to be neurologically active. Therefore, a need exists for low odor tertiary amine catalysts of low toxicity which will ensure adequate cure.

Tertiary amines containing an isocyanate-reactive group which tie the catalyst into the polymer network offer one solution to the problems of odor, toxicity and insufficient cure associated with more traditional amine catalysts. Adequate cure is ensured by incorporating the amine into the polymer chain. Also, the diffusion of the amine from the foam is prevented which minimizes the odor and possible health hazards associated with free amine. Examples of catalysts containing one isocyanate-reactive group include dimethylaminoethanol, tetramethyl-1,3-diamino-2-propanol, and 1-(2-hydroxypropyl)imidazole. A major disadvantage of these types of catalysts is their action as chain terminators in the polymer forming reaction. An alternative, catalytic alkoxylated amines containing three or more reactive sites such as triethanolamine or 'quadrol,' a propoxylated ethylenediamine, act as crosslinkers, reducing elastomer or foam flexibility and impact resistance. Tertiary amines containing two isocyanate-reactive groups are often difficult to prepare and isolate in high yield.

Polyurethane elastomers are block copolymers derived from the combination of a polymeric diol, a polyisocyanate, and a chain extending diamine or diol. The resulting copolymer is composed of soft segment blocks and hard segment blocks. The polymeric polyester or polyether comprises the flexible soft segment block which influences the elastic nature of the product and its low temperature performance while the polyisocyanate/chain extender units constitute the hard segment blocks which affect modulus, hardness and tear strength and determine the upper use temperature.

The hard segment blocks are partially segregated from the soft segment into domains or microdomains. Hydrogen bonding and dipole-dipole interactions between the polar groups provide a pseudo-crosslinked network structure between linear polyurethane chains such that the polymer has the physical characteristics and mechanical behavior of a covalently crosslinked network. Urea linkages which result from the use of diamine chain extenders yield stronger hydrogen bonds than carbamate linkages achieved by use of diol chain extenders. Consequently, the cohesive strength within the hard segments, and thus, overall polymer strength are greater in polyurethanes prepared from diamine chain extenders. Cast elastomer formulations cured with diamine chain extenders generally do not contain tertiary amine catalysts.

Methylenediphenyldiisocyanate [MDI]/1,4 butanediol cast elastomers or MDI/1,4 butanediol/high molecular weight diol one-shot elastomers showing a phase separated structure are often catalyzed. Another widely used polyisocyanate/extender combination is toluene diisocyanate [TDI] and methylene-bis(orthochloroaniline) [MoCA], a carcinogenic, high melting solid. The polyester or polyether elastomers utilizing TDI/MoCA exhibit general toughness and excellent wear and tear properties. Alternative aromatic diamine chain extenders can be used to make polyurethane/polyureas. The urea hydrogen bonding structure enhances physical properties in such polyurethane/polyureas.

Applications using both an aromatic diamine and a tertiary catalyst may include high resilience foams, semi-rigid foams, and RIM and microcellular elastomers. As to cast elastomers, the diamines increase the strength and load-bearing capabilities of the polymer product without a significant increase in polymer density.

To produce these polyurethanes, a mixture of an organic polyisocyanate, a polyol and perhaps other ingredients is cured with a derivative of an aromatic diamine, preferably a diaminobenzamide. The preparation of the polyurethane can be accomplished by a one-shot mode or by the preparation of a prepolymer and the subsequent curing of the prepolymer.

The organic polyisocyanate used in the preparation may be aromatic, aliphatic and/or cycloaliphatic with an aromatic diisocyanate being preferred. Broadly, $C_6$–$C_{25}$ aromatic and $C_2$–$C_{18}$ aliphatic and $C_5$–$C_{25}$ cycloaliphatic diisocyanates may be utilized. Arylene diisocyanates, i.e., those in which each of the two isocyanate groups is attached directly to an aromatic ring, are preferred. Examples of useful polyisocyanates include toluene-2,4-diisocyanate, 4-methoxy-1,3-phenylene diisocyanate, 4-isopropyl-1,3-phenylenediisocyanate, 4-chloro-1,3-phenylenediisocyanate, 4-butoxy-1,3-phenylenediisocyanate, 2,4-diisocyanatodiphenylether, mesitylene diisocyanate, durylene diisocyanate, 4,4'-methylene-bis(phenylisocyanate), 1,5-naphthalene diisocyanate, p,p'-biphenyl diisocyanate, o-nitro-p,p'-biphenyl diisocyanate, 4,4'-diisocyanatodibenzyl, 1,4-tetramethylene diisocyanate, 1,6-hexamethylene diisocyanate, 1,10-decamethylene diisocyanate, 1,4-cyclohexylene diisocyanate, xylene diisocyanate, 4,4'-methylenebis(cyclohexylisocyanate), 1,5-tetrahydronaphthalene diisocyanate and m- or p-phenylenediisocyanate. Toluene diisocyanate, both 2,4- and mixtures of the 2,4- and 2,6-isomers, is preferred.

The polyisocyanate as mentioned previously, is reacted with polyol. Several different types of polyols may be utilized, for instance, those derived from saturated and unsaturated polyhydrocarbons, polychloroprene, polyformals, polyalkylene ethers, polyesters, etc. Representative polyols include polyethylene ether glycol, polypropylene ether glycol, polytrimethylene ether glycol, polytetramethylene ether glycol, polypentamethylene ether glycol, polydecamethylene ether glycol, and poly-1,2-dimethylethylene ether glycol. Mixtures of two or more polyalkylene ether glycols may be employed if desired. Also, the following polyester glycols may be utilized: Polyester glycols prepared by the polymerization of cyclic lactones such as ε-caprolactone capped with diols or by the condensation polymerization of a dicarboxylic acid or its condensation equivalent and a molar excess of an organic polyol, representative diacids being succinic, glutaric and adipic acids and representative organic polyols being ethylene glycol, propylene glycol, 1,3-butanediol, 1,4-butanediol, 1,6-hexanediol, neopentyl glycol, and mixtures thereof. Adipates of lower alkyl polyols are preferred.

Finally, the curing agent and catalyst is utilized in the preparation of the polyurethane. The key to the present invention is the use of a common curing agent and catalyst which incorporates a tertiary amine functionality into the side chain of the aromatic diamine to form a catalytic chain extender. Specifically, the aromatic diamine derivative may be defined as having the general formulae:

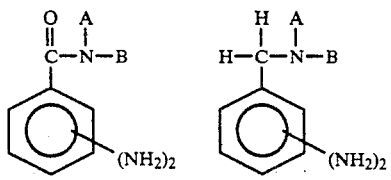

and

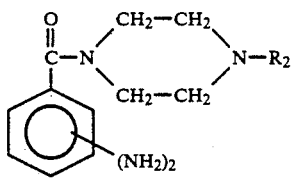

wherein:

A = H, $C_{1-4}$ alkyl, $C_{2-6}$ alkoxyalkyl or B; and

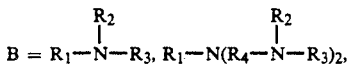

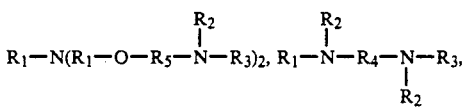

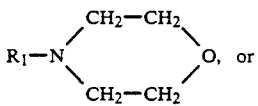

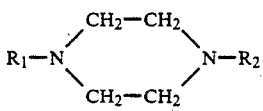

and
$R_1$ = $(CH_2)_n$ n = 2–5
$R_2$, $R_3$ = $C_{1-4}$ alkyl or $C_{2-6}$ alkoxyalkyl,
$R_4$ = $C_{2-9}$ alkyl and
$R_5$ = $C_{1-4}$ alkyl.

The diaminobenzamide derivatives represent the preferred embodiment.

Specific examples of the common curing agent-catalyst compounds which are represented by the generalized formulae include:
N,N-bis(3-dimethylaminopropyl)-diaminobenzamide
(2-morpholinoethyl)-diaminobenzamide
N,N-dimethylaminoethyl-N'-methyl-diaminobenzamide
$N^1$-(2-methoxyethyl)-$N^4$-(diaminobenzoyl)piperazine
$N^1$-ethyl-$N^4$-(diaminobenzoyl)piperazine
$N^1$-methyl-$N^4$-(diaminobenzoyl)-piperazine
(2-dimethylaminoethoxyethyl)-diaminobenzamide
The diaminobenzamide and the diaminobenzoyl may be any of the 2,3; 2,4; 2,6; 3,4; or 3,5 isomers.

In order to show the efficacy of the present invention, the following examples are offered.

EXAMPLE 1

Preparation of Catalytic Chain Extenders

To a slurry of 212.0 g of 2,4-dinitrobenzoic acid in 1400 ml of toluene was added with agitation 101.0 g of triethylamine, followed by 122.7 g of N-methylpiperazine. Next 75.7 g of phosphorus oxychloride was added dropwise at such a rate to maintain the reaction temperature below 90° C. The mixture was refluxed for 5 hrs, cooled to 80° C., and poured slowly into 1000 ml of aqueous 5% NaHCO$_3$ solution with stirring. The precipitate was filtered, washed with water and recrystallized from hot methanol to yield 161 g of $N^1$-methyl-$N^4$-(2,4-dinitrobenzoyl)piperazine, mp 130°–132° C.

A 2 liter autoclave was charged with 148 g of $N^1$-methyl-$N^4$-(2,4-dinitrobenzoyl)piperazine, 1300 ml of methanol and 5 g of a 5% palladium on carbon/50% water catalyst. The mixture was hydrogenated under 800 psi hydrogen pressure while maintaining the temperature below 100° C. with cooling. Hydrogen uptake ceased after 30 min. The mixture was cooled, filtered and the methanol removed under reduced pressure to give 101 g of $N^1$-methyl-$N^4$-(2,4-diaminobenzoyl)- piperazine, a light tan solid, mp 192° C.

The following amino amides are obtained in an analogous manner:

$N^1$-(2-methoxyethyl)-$N^4$-(2,4-diaminobenzoyl)piperazine (2-morpholinoethyl)-2,4-diaminobenzamide N,N-bis(3-dimethylaminopropyl)-diaminobenzamide The above-mentioned example was generated forming diaminobenzamide derivatives with a tertiary amine catalyst group substituted onto the diaminobenzamide. Similarly, other aromatic diamine derivatives can be formed by utilizing diaminobenzylchloride as a starting material and reacting it with a secondary amine group.

EXAMPLE 2

Preparation of a Non-catalytic Diaminobenzamide

To a slurry of 215.1 g of 2,4-dinitrobenzoic acid in 1000 ml of toluene was added with stirring 196.2 g of morpholine. Next 76.5 g of phosphorus oxychloride was added dropwise at such a rate to maintain the reaction temperature below 90° C. The mixture was refluxed for 5 hrs, cooled to 80° C., and slowly poured into 1000 ml of aqueous 5% $NaHCO_3$ solution with stirring. The precipitate was filtered, washed with water and dried to yield 231.7 g of N-(2,4-dinitrobenzoyl)morpholine, mp 159°–161° C.

A two liter autoclave was charged with 130.6 g of N-(2,4-dinitrobenzoyl)-morpholine, 1200 ml methanol and 6.2 g of a 5% palladium on carbon/50% water catalyst. The mixture was hydrogenated at 800 psi while maintaining the temperature between 60°–100° C. Hydrogen uptake ceased after 30 min. The mixture was cooled, filtered and methanol removed at reduced pressure. The residue was crystallized from toluene to yield 97.1 g of N-(2,4-diaminobenzoyl)morpholine, mp 114°–115° C.

EXAMPLE 3

Reactivity of Polyurethane Formulations Using Catalytic and Non-Catalytic Diaminobenzamide Curing Agents Chain extender reactivity is measured using a Polyair polyurethane rheometer in a representative formulation consisting of two equivalents of toluenediisocyanate prepolymer, one equivalent of polyester diol and one equivalent of aromatic diamine. The isocyanate prepolymer is Adiprene 167, a TDI-terminated 1000 molecular weight polytetramethyleneglycol available from Uniroyal. The diol is CAPA 200 from Interox, a polycaprolactone of 274 equivalent weight.

Aromatic diamine is dissolved in an isoequivalent of CAPA 200. Solid amines are melted under a protective nitrogen blanket then mixed to hasten dissolution. The amine/polyol blend is checked for homogeneity and stability at 50° C., then the correct weight is placed in a 35 mm deep, 20 mm i.d. cylindrical stainless steel cup. Alternatively, exact weights of amine and diol are added directly to the test cup instead of being made in a master batch. The correct weight of Adiprene 167 thermostatted at 50° C. is carefully layered above the diol/diamine. The test cup is inserted into a thermostatted block which is also maintained at 50° C. Total weight of the 2:1:1 NCO prepolymer:diol:diamine mixture is 7.0 g.

Above the test cup in the polyurethane rheometer is a close fitting (19.5 mm o.d.) perforated plunger mounted by a removable key on a shaft driven at constant pressure by a reciprocating air motor. The plunger base is 6 mm thick with six radially distributed 2 mm holes extending through the base. At full stroke the plunger reaches the cup bottom; at the upper limit a teflon seal retains material in the cup. A series of 'O' rings cleans the shaft of formulation on each upstroke.

As each new plunger is mounted, its stroke rate is checked and calibrated against 'O' ring resistance. The normal set point is a 5 Hz stroke rate in an empty cup which requires approximately 20 psia pressure. Shaft movement is detected by magnetic sense switches at the top and bottom of the rheometer shaft and is compared against a (Global Specialties Corp. model 4401) 1000 Hz frequency standard using a 24 Kb Ohio Scientific C4PMF 8 bit microcomputer.

The reactivity test is started by triggering the pressure driven plunger using a contact switch which also starts a floppy disc-based operating program. As the components react, the formulation viscosity increases causing a decrease in the shaft stroke rate. Time and computed relative viscosity, normalized to the 200 millisecond cycle time for a specific plunger, are displayed on a CRT monitor in real time and stored in microcomputer memory. Relative viscosity units may be correlated to actual viscosities by extended calibration.

In a test run individual cycles are first timed, averaged over a minimum period ($T_{min}$) and accumulated. After 80 data points have been recorded the array holding the data is compressed to 40 points and $T_{min}$ is doubled. This continues until the device is stopped or disabled by a program interrupt.

BASIC software allows X-Y plotting of time-relative viscosity on the microcomputer CRT and assignment of run information such as sample name and notebook number. After each rheometer run, data are transferred via the Ohio Scientific RS-232 printer port to a PDP 11/44 minicomputer. Graphics displaying multiple run time-relative viscosity data may be produced on a lab VT-100 minicomputer terminal. A final level of data transmission is from minicomputer to corporate mainframe from which numerical lineshape analyses and graphics are generated.

A polynomial exponential model was chosen to best calculate rheometer lineshapes:

$$\text{relative viscosity} = e(1 + A^*t + B^*t^2 + C^*t^3)$$

The first order term, "A", measures initial reactivity. The higher order terms describe the more complex buildup of cohesive forces in the final polymer. T/5000, the time at which the relative viscosity is 5000 units, is a single valued potlife time that provides succinct, though only partial, reactivity comparisons among chain extenders in a specific test formulation.

Pot life reactivity data for catalytic benzamides are found in Table I. Compounds 1, 2 and 7 are provided as examples of non-catalytic chain extenders. The reactivity of N¹-methyl-N⁴-(2,4-diaminobenzoyl)piperazine, compound 3, is nearly an order of magnitude greater than that for structurally similar N-(2,4-diaminobenzoyl)morpholine, compound 2, paralleling results observed for catalytic benzoates. Ether functionality in N¹-methoxyethyl-N⁴-(2,4-diaminobenzoyl) piperazine, compound 5, improves polyol solubility over its methyl analog, compound 3. A T/5000 of 0.32 min for N,N-bis(3-dimethylaminopropyl)-2,4-diaminobenzamide, compound 4, reflects the contribution of two tertiary amine groups.

TABLE I

| Compound No. | Chain Substitution on Amide | T-5000 (min) |
| --- | --- | --- |
| 1 | —N(CH₂CH₃)₂ | 8.0 |
| 2 | —N(morpholine) | 7.0 |
| 3 | —N(piperazine)NCH₃ | 0.93 |
| 4 | —N(CH₂CH₂CH₂N(CH₃)₂)₂ | 0.32 |
| 5 | —N(piperazine)NCH₂CH₂OCH₃ | 2.4 |
| 6 | —NHCH₂CH₂N(morpholine) | 4.2 |
| 7 | —NHCH₂CH(CH₃)₂ | 8.3 |

The single FIGURE of the drawing illustrates the rheological data for compounds 2, 3, 4, and 5.

The tertiary amine portion of the molecule which is situated in a side chain of the aromatic diamine, while acting as a polyurethane catalyst, is bound to the polymer network allowing for adequate polymer cure while preventing later diffusion of the catalytic species from the polyurethane thereby eliminating odor and toxicity as problems. The aromatic diamine provides enhanced PUR physical properties.

The tertiary amine catalyst is chemically bound to an aromatic diamine chain extender that is incorporated into the polymer chain. Unlike other tertiary amine catalysts which are bound to the polymer network by an isocyanate reactive group, these catalysts are chain extenders, not chain terminators or crosslinkers.

The present invention has been described with reference to specific embodiments thereof. However, these embodiments should not be considered a limitation on the scope of the invention, such scope should be ascertained by the following claims.

We claim:

1. In a process for the preparation of a polyurethane composition by reacting a polyisocyanate, a polyol, a chain extender and a catalyst, the improvement which comprises reacting a catalytic chain extender comprising an aromatic diamine having tertiary amine functionality incorporated into a side chain of the aromatic diamine.

2. A polyurethane composition obtained by reacting a polyisocyanate, a polyol and a catalytic chain extender wherein the catalytic chain extender comprises an aromatic diamine having a tertiary amine functionality incorporated into a side chain of said aromatic diamine.

* * * * *